(12) United States Patent
Zhou et al.

(10) Patent No.: US 11,991,803 B2
(45) Date of Patent: May 21, 2024

(54) FLYBACK CONVERTER AND LED DRIVER USING THE FLYBACK CONVERTER

(71) Applicant: SIGNIFY HOLDING B.V., Eindhoven (NL)

(72) Inventors: Yufei Zhou, Shanghai (CN); Dennis Claessens, Eindhoven (NL); Henglian Luo, Eindhoven (NL)

(73) Assignee: SIGNIFY HOLDING, B.V., Eindhoven (NL)

( * ) Notice: Subject to any disclaimer, the term of this patent is extended or adjusted under 35 U.S.C. 154(b) by 541 days.

(21) Appl. No.: 17/264,556

(22) PCT Filed: Jul. 26, 2019

(86) PCT No.: PCT/EP2019/070156
§ 371 (c)(1),
(2) Date: Jan. 29, 2021

(87) PCT Pub. No.: WO2020/025470
PCT Pub. Date: Feb. 6, 2020

(65) Prior Publication Data
US 2021/0315080 A1    Oct. 7, 2021

(30) Foreign Application Priority Data

Aug. 1, 2018 (WO) ............... PCT/CN2018/098112
Nov. 5, 2018 (EP) ..................................... 18204368

(51) Int. Cl.
*H05B 45/385* (2020.01)
*H02M 1/00* (2006.01)
*H02M 3/335* (2006.01)

(52) U.S. Cl.
CPC ........ *H05B 45/385* (2020.01); *H02M 1/0009* (2021.05); *H02M 3/33573* (2021.05)

(58) Field of Classification Search
None
See application file for complete search history.

(56) References Cited

U.S. PATENT DOCUMENTS

| | | | | |
|---|---|---|---|---|
| 6,175,484 B1* | 1/2001 | Caruthers | ............... | F02D 41/20 361/159 |
| 6,285,139 B1* | 9/2001 | Ghanem | ............ | G01R 31/2653 315/291 |
| 6,577,512 B2* | 6/2003 | Tripathi | ................. | H05B 45/10 363/21.17 |
| 7,262,559 B2* | 8/2007 | Tripathi | ................. | H05B 45/10 315/291 |
| 7,550,931 B2* | 6/2009 | Lys | ........................ | H05B 47/10 362/253 |
| 8,558,474 B1* | 10/2013 | Zhang | .................... | H05B 45/10 315/276 |
| 8,829,819 B1* | 9/2014 | Angeles | ............... | H05B 45/375 315/308 |
| 9,232,596 B2* | 1/2016 | Jelaca | .................. | H05B 45/327 |

(Continued)

*Primary Examiner* — Srinivas Sathiraju

(57) ABSTRACT

A dual-switch flyback converter in which the output current, in operating regions where a constant output current is required, can be regulated from the primary side. The output current is regulated constantly regardless of the input and output voltages by compensating the peak current in the primary winding with the average current in the clamping diode, or the conduction duration of the clamping diode.

15 Claims, 7 Drawing Sheets

(56) References Cited

U.S. PATENT DOCUMENTS

| | | | | |
|---|---|---|---|---|
| 9,338,839 B2* | 5/2016 | Recker | | H05B 45/38 |
| 9,369,050 B1* | 6/2016 | Xiong | | H02M 3/33523 |
| 9,408,269 B2* | 8/2016 | Zhu | | H05B 47/10 |
| 9,474,120 B2* | 10/2016 | Tyrrell | | H05B 45/385 |
| 9,585,222 B2* | 2/2017 | Zhu | | H05B 47/16 |
| 9,693,417 B2* | 6/2017 | Knoedgen | | H05B 45/3725 |
| 9,883,561 B1* | 1/2018 | Liang | | H05B 45/10 |
| 9,961,734 B2* | 5/2018 | Zhu | | H05B 47/10 |
| 10,264,642 B2* | 4/2019 | Liang | | H05B 45/31 |
| 10,291,136 B2* | 5/2019 | Song | | H02M 3/33569 |
| 10,342,087 B2* | 7/2019 | Zhu | | H05B 39/044 |
| 10,356,864 B2* | 7/2019 | Chen | | H05B 45/3725 |
| 10,455,657 B2* | 10/2019 | Zhu | | H05B 45/385 |
| 11,264,910 B2* | 3/2022 | Saes | | H02M 3/33515 |
| 11,582,843 B1* | 2/2023 | Gritti | | H02M 3/156 |
| 11,825,571 B2* | 11/2023 | Gritti | | H02M 3/156 |
| 2010/0026208 A1* | 2/2010 | Shteynberg | | H05B 45/3725 315/297 |
| 2010/0253167 A1 | 10/2010 | Cecconello et al. | | |
| 2010/0254167 A1* | 10/2010 | Cecconello | | H02M 3/33569 363/21.13 |
| 2011/0101877 A1* | 5/2011 | Zhan | | H05B 45/385 315/206 |
| 2012/0176060 A1* | 7/2012 | Luccato | | H02M 3/335 315/291 |
| 2013/0063047 A1* | 3/2013 | Veskovic | | H05B 45/385 315/307 |
| 2014/0009085 A1* | 1/2014 | Veskovic | | H05B 45/30 315/307 |
| 2014/0159585 A1* | 6/2014 | Reed | | H05B 45/50 315/210 |
| 2014/0265932 A1* | 9/2014 | Greenwood | | H05B 45/385 315/307 |
| 2014/0285092 A1* | 9/2014 | Knoedgen | | H05B 45/3725 315/223 |
| 2014/0300274 A1* | 10/2014 | Acatrinei | | H05B 45/3578 315/122 |
| 2014/0312773 A1* | 10/2014 | Zulim | | H02M 3/158 315/113 |
| 2015/0264769 A1* | 9/2015 | Jelaca | | H05B 45/327 315/206 |
| 2015/0382429 A1* | 12/2015 | Knoedgen | | H05B 45/37 324/414 |
| 2016/0119992 A1* | 4/2016 | Tyrrell | | H05B 45/10 315/200 R |
| 2016/0134194 A1* | 5/2016 | Mao | | H02M 5/273 363/21.17 |
| 2016/0181927 A1* | 6/2016 | Chang | | H02M 1/42 363/21.02 |
| 2017/0047852 A1* | 2/2017 | Huang | | H02M 3/00 |
| 2017/0071039 A1* | 3/2017 | Chitta | | H02M 1/08 |
| 2017/0238382 A1* | 8/2017 | Veskovic | | H05B 45/10 315/307 |
| 2018/0279429 A1* | 9/2018 | Sadwick | | H05B 45/3725 |
| 2018/0294731 A1* | 10/2018 | Song | | H02M 3/33569 |
| 2019/0069364 A1* | 2/2019 | Zhu | | H05B 47/10 |
| 2019/0075629 A1* | 3/2019 | Chitta | | H05B 45/37 |
| 2020/0245433 A1* | 7/2020 | Veskovic | | H05B 45/00 |
| 2021/0006168 A1* | 1/2021 | Saes | | H02M 3/33515 |
| 2021/0242785 A1* | 8/2021 | Veskovic | | H02M 3/33538 |
| 2021/0315080 A1* | 10/2021 | Zhou | | H02M 3/33507 |

* cited by examiner

FLYBACK CONVERTER AND LED DRIVER USING THE FLYBACK CONVERTER

CROSS-REFERENCE TO PRIOR APPLICATIONS

This application is the U.S. National Phase application under 35 U.S.C. § 371 of International Application No. PCT/EP2019/070156, filed on Jul. 26, 2019, which claims the benefit of International Patent Application No. PCT/CN2018/098112, filed Aug. 1, 2018 and European Patent Application No. 18204368.7, filed on Nov. 5, 2018. These applications are hereby incorporated by reference herein.

FIELD OF THE INVENTION

This invention relates to flyback converters for example for use in LED drivers.

BACKGROUND OF THE INVENTION

Flyback converters are used for both AC/DC and DC/DC conversion, with galvanic isolation provided between the input and any outputs. The flyback converter functions as a buck-boost converter with the inductor split to form a transformer, so that the voltage ratios are multiplied with an additional advantage of isolation.

In the on-state of the converter, energy is transferred from the input voltage source to the transformer, during which time an output capacitor supplies energy to the output load. In the off-state, the energy is transferred from the transformer to the output load (and the output capacitor). This is called the freewheeling phase.

One design of particular interest is the dual-switch design. This makes use of two transistors between the input voltage and the transformer, so that the overall voltage stress is divided equally over both transistors. Instead of turning leakage energy into losses, leakage energy is returned to the input supply via two diodes. The diodes also clamp the drain-source voltages of both transistors to the input voltage, so the voltage rating of the transistors can be selected according to input voltage, without a bigger margin.

The dual-switch flyback converter is becoming the preferred choice for the DC-DC conversion topology in low to medium power application for switch mode power supplies, for example as used in LED drivers, over the resonant half-bridge converter family. The dual switch design offers high power-density, low voltage stress, a reliable structure and a simple control scheme. A prior art document showing a dual switch flyback converter for driving a LED is US 2012/0176060A1. Another prior art showing this kind of converter is US20100254167A1, with a sensing element for sensing zero voltage and achieving zero voltage switching. U.S. Pat. No. 6,175,484B1 discloses a converter that can sense the peak current in the main inductor in the charging phase and a current in the freewheeling phase.

In the application of LED drivers, current regulation is required, by which the switch mode power converter is controlled to deliver a desired LED current, at the secondary side. Primary-side current regulation is, however, preferred for controlling the LED current and voltage from the primary side. It is more cost effective and robust over secondary-side regulation, since, first, the high-voltage or common-mode insulation of the control circuit is not needed in the primary-side control approach and second, auxiliary circuitry for powering the control part is simplified. Moreover, being placed on the primary side, the regulation circuitry is capable of processing any information from the mains in a very simple and effective way.

Normally the primary side regulation in a single-switch flyback converter makes use of the peak current in the primary winding and the detected duty cycle of the output diode, and thereby derives a signal representing the average output current. The peak current in the primary winding in single-switch flyback converters is not identical to the peak current in the secondary winding, but the difference between these two currents is generally a fixed value over the entire operation range. Thus, the difference can be compensated with a fixed correction.

However, in the dual-switch flyback converter, the demagnetizing voltage of the leakage inductor has a strong dependency on input voltage and load voltage. If the input voltage is high, the inductor intends to discharge more on the secondary side; otherwise it is easy to leak the power to the primary side. Therefore the difference between peak currents in the primary and secondary windings cannot be compensated with a fixed correction. This is discussed below in more detail.

There is therefore a need for a flyback converter circuit which enables implementation of effective primary side regulation, and which may be implemented based on a dual switch flyback topology.

SUMMARY OF THE INVENTION

It is a concept of the invention to provide a dual-switch flyback converter in which the output current is regulated from the primary side. To make the current regulation more accurate, the peak current measured in the primary winding is compensated by taking into account the clamping diode current. This may be measured or else it may be deduced from the conduction duration of the clamping diodes.

The invention is defined by the claims.

According to examples in accordance with an aspect of the invention, there is provided a flyback converter comprising:
- a transformer comprising a primary side for connection to an input supply and a secondary side for connection to a load;
- a first switching circuit at the primary side adapted to allow the primary side to accumulate power from the input supply in a charging phase and to allow the secondary side to release a portion of the accumulated power to the load in a freewheeling phase;
- a first sensing circuit to sense the primary side current in the charging phase; and
- a second switching circuit at the primary side to allow another portion of accumulated power at the primary side to flow back to the input supply as a leakage current, in the freewheeling phase;
- a second sensing circuit to derive a parameter which depends on the leakage current; and
- a controller to derive a control signal for controlling the first switching circuit in dependence on the outputs of the first and second sensing circuits;
- wherein the converter may further comprise a time detection circuit adapted to detect a time period related to the freewheeling phase, and the controller is adapted to calculate a difference between the total charge released from a peak current in the primary winding for the time period related to the freewheeling phase and the charge released by the leakage current in the freewheeling phase, wherein said difference is associated with the secondary side current.

This flyback converter makes use of two primary side sensing approaches—the primary side transformer current and a leakage current (which is a current resulting during de-magnetization of a leakage inductance). In this way, the primary side sensing is able to determine the current at the secondary side more accurately, and thereby provide improved primary side regulation of the output current at the secondary side. The converter is particularly of interest when the leakage current is not determined by the converter and its load only (so that the difference between the primary side current and the secondary side current is not constant) but instead depends on the variance of the input voltage too, for example as is the case for a dual switch flyback topology. The second sensing circuit provides a variable compensation to the primary side current sensing to enable more effective primary side current regulation.

The second sensing circuit may be based on measurement of an amplitude of the leakage current or determining the leakage current based on time periods during which the leakage current flows. These options will be apparent from the discussion below.

The controller is for example adapted to:
  determine a secondary side current at the secondary side based on the sensed primary side current and the parameter which depends on the leakage current; and
  derive the control signal for controlling the first switching circuit in dependence on the determined secondary side current and a reference current.

The two sensing circuits are thus able to provide a determination of the secondary side current, which can then be used as a feedback control parameter for regulating the secondary side current, i.e. the load current, without requiring load sensing at the secondary side.

The first switching circuit may comprise synchronized first and second transistors in series each side of a primary side winding at the primary side, between a positive and negative input, and the second switching circuit comprises first and second diodes in series each side of the primary side winding and in series with the input supply, between a negative input and a positive input, thereby forming an H-bridge, and the control signal being gate or base drive signals for the transistors, the flyback converter further comprising:
  the flyback converter further comprises the input supply which comprises:
  an input capacitor between the positive input and the negative input, and the second switching circuit is adapted to allow the leakage current to flow back to the input capacitor and the input capacitor ($C_{in}$) is adapted to be connected to a time varying voltage supply.

This architecture defines more specific circuits of the dual switch flyback converter, which is a high efficiency, high power density and low operating voltage converter design. Such a converter design typically requires secondary side regulation, but the sensing approach enables effective primary side regulation.

The flyback converter may further comprise an output diode between the secondary side and an output load connection, which output diode is adapted to block the induced power to flow to the load in the charging phase and allow it in the freewheeling phase.

This output diode conducts during the freewheeling phase. The freewheeling phase may thus be defined as the time period during which the output diode conducts.

The first sensing circuit may comprise:

a primary winding current sensing resistor in series with the first switching circuit and the primary side winding; and
  a sample and hold circuit for sampling a peak voltage across the primary winding current sensing resistor which is representative of the peak current through the primary side winding.

The first sensing circuit samples a peak primary side current and provides this as a first feedback parameter, but scaled in dependence on the time of the freewheeling phase or a portion of the freewheeling phase.

Preferably, the controller is adapted to derive the control signal ($V_C$) for controlling the first switching circuit in dependence on said difference.

The second sensing circuit may comprise:
  a freewheeling current sense resistor in series with the second switching circuit and the primary side winding, adapted to sense the amplitude of the leakage current in the freewheeling phase as the parameter;
  a filter; and
  a comparator, wherein the output of the comparator is provided as the output of the second sensing circuit.

The comparator enables scaling of the sensed freewheeling current as well as the addition of an offset. Thus it functions as an adder/amplifier/comparator. The scaling and offset are chosen so that when used to modify the sensed primary side current, an accurate representation of the secondary side current is obtained.

The filter output is for example provided to the comparator which compares the filter output with a reference, and the comparator comprise a feedback loop with a certain gain to the filter output.

In this way, the output of the second sensing circuit is used to provide an additional compensation input to the primary side current sensing to make the estimation of the secondary side current more accurate.

The time detection circuit is for example adapted to detect:
  a first portion, as the parameter, of the freewheeling phase during which the leakage current at the primary side drops from a peak value to zero; and
  a second portion, from when the leakage current at the primary side drops to zero to the secondary side current to the load drops to zero, of the freewheeling phase.

The peak primary side current is thus used as a feedback control input. The peak value is used during the freewheeling phase only. By taking into account the time periods of the freewheeling phase (while the primary side current drops to zero and while the output diode current drops to zero), the compensation can be made accurate. By providing an accurate estimation of the secondary current, a feedback control loop can be established.

The controller may comprise a filter that is charged and discharged according to the detected portions of time.

The controller may further comprise:
  a charging circuit for providing the sampled peak voltage to the filter during a second portion, from when the leakage current at the primary side drops to zero to the secondary side current to the load drops to zero, of the freewheeling phase of the freewheeling phase.

This is the portion of the freewheeling phase during which the current to the load drops to zero.

The chopper circuit may further be for providing a ground signal to the filter at times outside the portion of the freewheeling phase.

In this way, the freewheeling current itself does not need to be sensed, since the modification to the primary side sensed current may be obtained based on the conduction time periods during which time the freewheeling current is flowing.

The chopper circuit provides the sensed peak primary current to the filter for a time period which may be considered to be a solo output diode phase, which is one where the output diode conducts current from the secondary side to the load, whereas the diodes of the second switching circuit are no longer conducting, i.e. the primary side freewheeling has completed.

It can be shown that this processing of the peak primary current combined with the time period of the solo output diode phase also enables an estimation of the secondary current (without actually measuring it), so that a feedback control loop can be established.

The time detection circuit may comprise:
a zero crossing detection circuit and the time detection circuit is for deducing the time period according to the zero crossing signal; or
a zero crossing detection circuit to detect the zero crossing signal and a latch circuit for deducing the time period, having as inputs a base or gate drive signal for the first switching circuit and the detected zero crossing detection signal.

The use of a latch is resistant to a resonance which may be induced in a discontinuous operation mode, and prevents false triggers.

The flyback converter may comprise a regulated current driver, wherein the control signal for controlling the first switching circuit is for regulating an output current delivered by the secondary side.

The invention also provides a LED driver comprising a flyback converter as defined above comprising an input for connection to an external power supply and an output for connection to a LED load.

The driver is for example of particular interest for a rated power in the range 30 W to 300 W.

The invention also provides a lighting device comprising the LED driver as defined above and the LED load connected to the LED driver.

These and other aspects of the invention will be apparent from and elucidated with reference to the embodiment(s) described hereinafter.

BRIEF DESCRIPTION OF THE DRAWINGS

For a better understanding of the invention, and to show more clearly how it may be carried into effect, reference will now be made, by way of example only, to the accompanying drawings, in which.

DETAILED DESCRIPTION OF THE EMBODIMENTS

Figure 1:
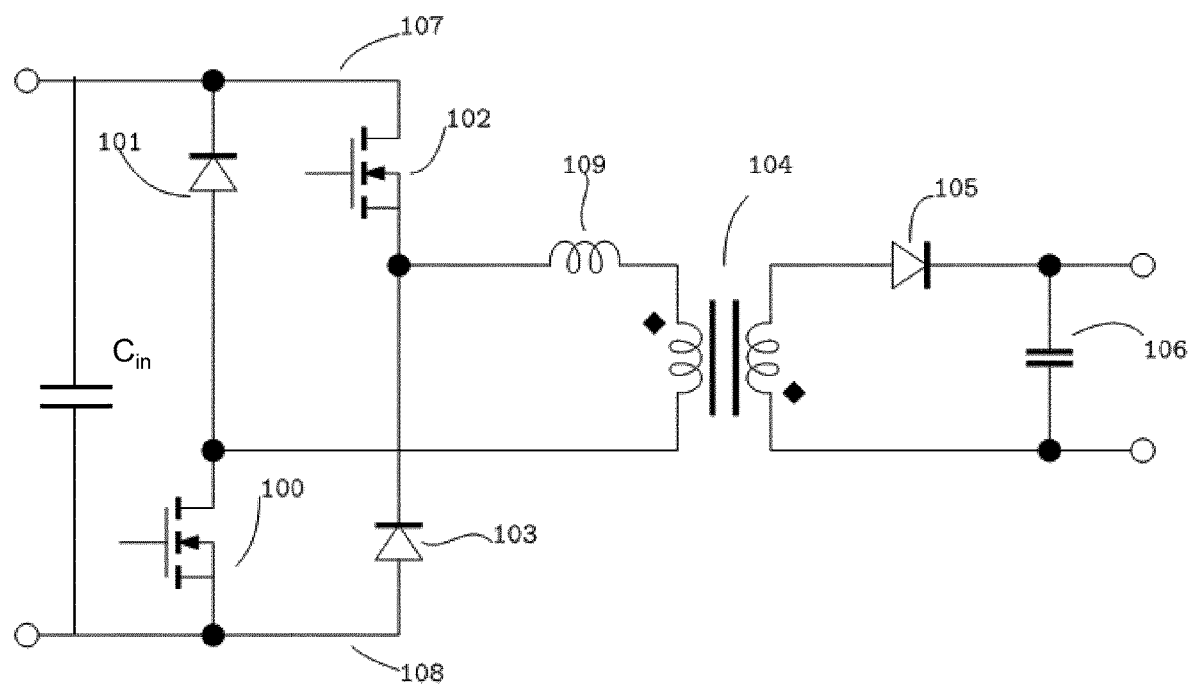
FIG. 1 shows a known dual switch flyback converter.

The invention will be described with reference to the Figures.

It should be understood that the detailed description and specific examples, while indicating exemplary embodiments of the apparatus, systems and methods, are intended for purposes of illustration only and are not intended to limit the scope of the invention. These and other features, aspects, and advantages of the apparatus, systems and methods of the present invention will become better understood from the following description, appended claims, and accompanying drawings. It should be understood that the Figures are merely schematic and are not drawn to scale. It should also be understood that the same reference numerals are used throughout the Figures to indicate the same or similar parts.

The invention provides a dual-switch flyback converter in which the output current, in operating regions where a constant output current is required, can be regulated from the primary side. The output current is regulated constantly regardless of the input and output voltages by compensating the peak current in the primary winding with the average current in the clamping diode, or the conduction duration of the clamping diode.

FIG. 1 shows a known dual switch flyback topology. The circuit comprises a first branch of a transistor 100 and a diode 101, and a second branch of a transistor 102 and a diode 103. The branches connect to the primary side of a transformer 104. The secondary side of the transformer connects through an output diode 105 to the load 106, represented as a capacitor. The branches are in parallel between the input supply rails 107, 108. An optional additional inductor 109 is shown in series with the transformer primary side winding. An input capacitor $C_{in}$ is receives the charge flowing through the diodes during the freewheeling phase.

The junction between the transistor 100 and diode 101 connects to one end of the primary side winding of the transformer 104, and junction between the transistor 102 and diode 103 connects to the other end of the primary side winding of the transformer 104. They form an H-bridge circuit with diagonal transistors and diodes.

Thus, the primary side of the transformer is for connection to an input supply and the secondary side is for connection to the load. The transistors 100, 102 implement a first switching circuit at the primary side adapted to allow the primary side to accumulate power from the input supply in the charging phase and to allow the secondary side to release a portion of the accumulated power to the load in the freewheeling phase.

The diodes 101, 103 implement a second switching circuit at the primary side to allow another portion of accumulated power at the primary side to flow back to the input supply, for storage on the input capacitor $C_{in}$, as a leakage current, in the freewheeling phase.

Figure 2:
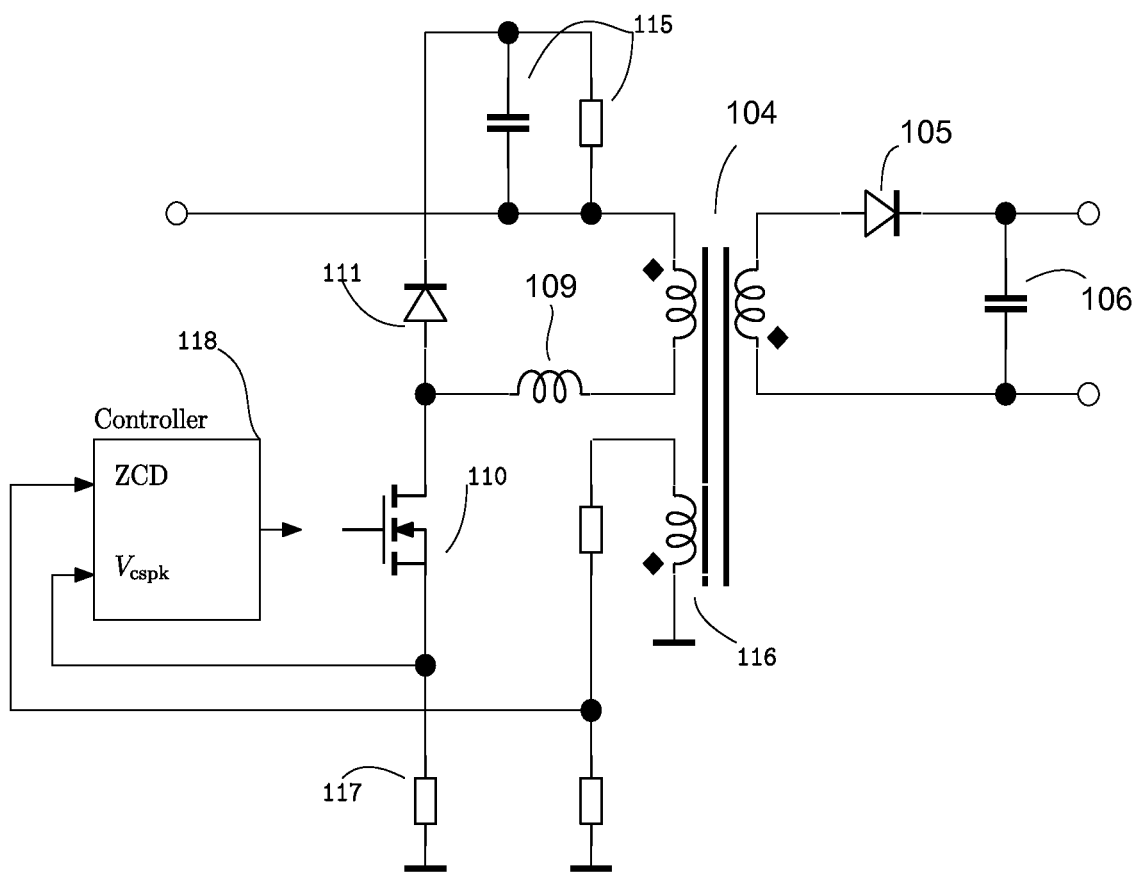
FIG. 2 shows a known single switch flyback converter with primary side regulation.

For the purposes of comparison and explanation, FIG. 2 shows a single-switch flyback converter, with primary side regulation. There is a single transistor 110 and diode 111. The diode 111 clamps the voltage of the transistor 110 to a level higher than the supply by means of a level shift circuit 115.

Normally the primary side regulation in a single-switch flyback converter as shown in FIG. 2 makes use of the peak current in the primary winding (or the peak current in the active device 110) sensed by a resistor 117 and the detected duty cycle of the output diode 105, sensed at the zero crossing detection (ZCD) terminal from an induced voltage on an auxiliary winding 116 by a voltage divider, to derive a signal representing the average output current.

A controller 118 controls the single transistor 110 based on the detected duty cycle (based on zero crossing detection of the auxiliary winding voltage) and the sensed primary side current.

The peak current in the primary winding in single-switch flyback converters is clearly not identical to the reflected peak current in the secondary winding because of the existence of leakage inductance in the power transformer. This means that there is a gap between the derived output current and the actual output current. From the control system point of view, an offset exists in the sensing of the feedback signal, so an error between the reference and the controlled output follows. To eliminate this error, certain means of compensation must be provided by the controller. However, the sensed primary side current in the single-switch flyback converter has a fixed relationship to the secondary side current so that the compensation is easy to implement. In particular, the de-magnetizing voltage of the leakage inductor is independent of the load voltage as in the freewheeling phase the voltage on the primary winding is proportional with the voltage on the secondary winding, because of the principle of operation of the transformer.

In existing implementations of the primary-side regulated single-switch flyback converter, a fixed compensation is generally applied.

Figure 3:
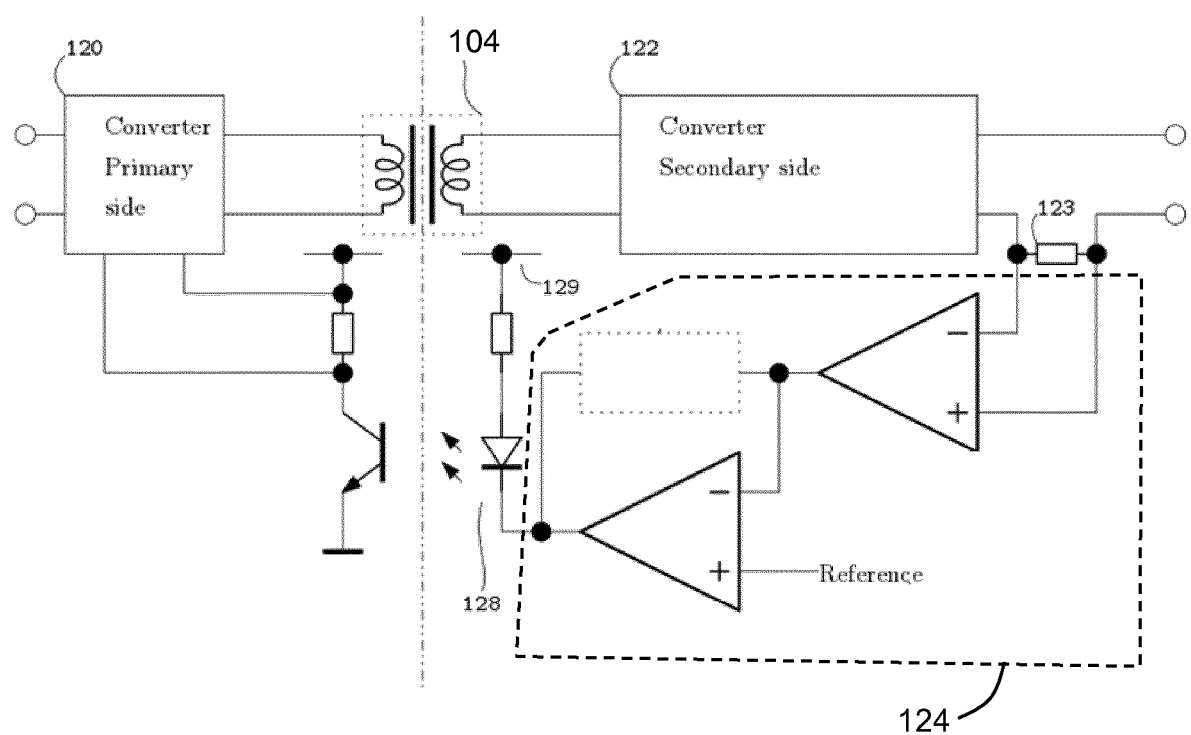
FIG. 3 shows a known single switch flyback converter with secondary side regulation.

For completeness, FIG. 3 shows a secondary side regulation approach. The converter is represented simply as primary side block 120 and secondary side block 122. A high-voltage common-mode insulation 128 is needed, implemented by means of opto- or magnetic-transmitters. This provides isolated feedback of the secondary side current sensed across sense resistor 123. In the example shown, a drive circuit 124 drives a photodiode 128 from a low voltage supply 129. The photodiode provides an optical signal to a phototransistor at the primary side.

The advantage of primary side regulation is that the drive circuit 124 is not necessary and the low voltage power supply 129 for the drive circuit is simplified. Moreover, being placed on the primary side, the regulation circuitry is capable of processing any information from the mains (such as timing information) in a very simple way.

When controlled in critical conduction or discontinuous modes, a flyback converter (either in single switch or dual switch configuration), is essentially a current source with constant linear control if the input and output voltages are constant, which makes the control of the circuit much simpler to implement, especially for LED driver applications where a constant output current is desired.

Compared to the traditional single-switch flyback converter (shown in FIG. 2), the dual-switch flyback converter has the voltage stress on the active devices limited to the input power rail (107 and 108) such that low cost devices with normal voltage ratings can be used. The invention implements a variable correction that compensates the difference between the detected current in the primary side and the controlled current in the secondary side, such that a cost-effective and robust primary side regulation may be applied to the compact, highly efficient and reliable dual-switch flyback converter.

In the dual-switch flyback case, the de-magnetizing voltage of the leakage inductor is the difference of the input voltage (between power rails 107 and 108) and the reflected load voltage. The load voltage can still be predicted especially if the load is a LED with a stable forward voltage; but the input voltage between the rails and on the capacitor $C_{in}$ is determined more by the supply into the driver which is varying over time. Thus, the de-magnetizing time of the leakage inductor, which finally translates to the difference of peak currents in the primary and secondary windings, depends strongly on the input voltage which is more independent of the converter and the load. With a fixed compensation the output current is load dependent in the single switch flyback converter, the same principle would not be applicable for dual switch flyback converter and the load regulation of the converter needs to be improved.

Figure 4:
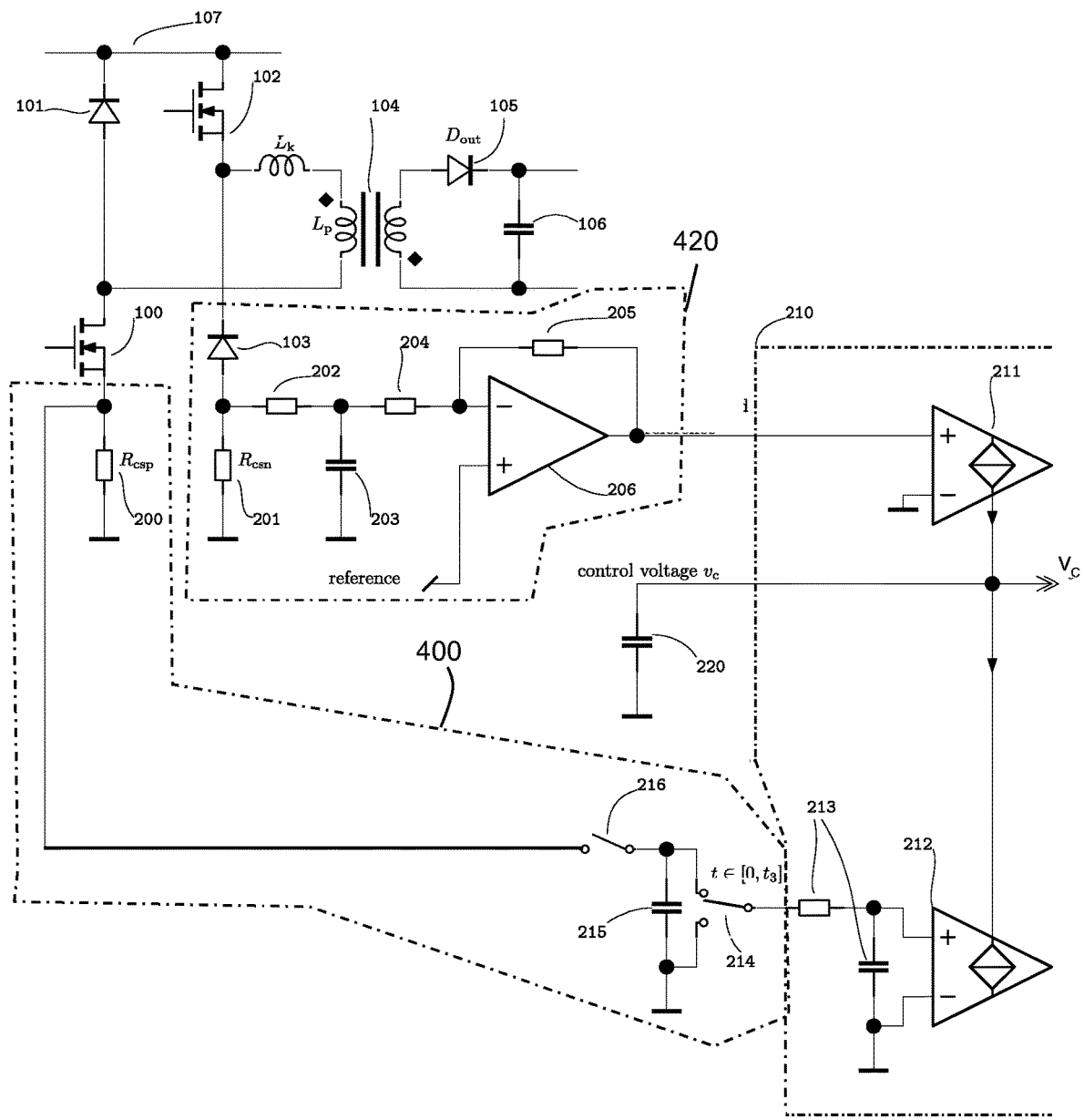
FIG. 4 shows a first example of a primary side sensing circuit for application to a flyback converter.

FIG. 4 shows a first example of circuit for implementing a primary side regulation scheme for use with the dual switch flyback converter of FIG. 1.

The circuit comprises a first sensing circuit 400 to sense the primary side current in the charging phase. This circuit senses the current flowing through the transistor 100, and hence the current flowing through the primary side winding. Of course, the same current flows through transistor 102 so the sensing can be performed at any location along the current path. It comprises a current sense resistor 200 ($R_{csp}$).

A second sensing circuit 420 is used to derive a parameter which depends on the leakage current. This example of the second sensing circuit senses the current flowing through the diode 103, and hence the de-magnetization leakage current. Of course, the same current flows through diode 101 so the sensing can be performed at any location along the current path. It comprises a current sense resistor 201 ($R_{csn}$) and a circuit for processing the sensed current. In this example, the processing circuit comprises a filter 202, 203 and an operational amplifier 206 with resistors 204 and 205, to provide a gain tuning/feedback compensation function for the operational amplifier 206.

A controller 210 is used to derive a control signal $V_C$ for controlling the transistors 100, 102 (i.e. the first switching circuit) in dependence on the outputs of the first and second sensing circuits 400, 420. The controller 210 is implemented as two operational transconductance amplifiers (OTAs) 211, 212, which regulate an output signal.

Note that the boundary between the controller 210 and the sensing circuits is somewhat arbitrary and is only used for the purposes of explanation. In practice there is one overall circuit providing the combined sensing and processing functions.

The difference of the output currents of the two OTAs is integrated on a phase-compensation network (in the embodiment the phase-compensation is performed by a single capacitor 220). Note that the output of the OTA 211 is a positive charging current and the output of the OTA 212 is a negative discharging current, with respect to the capacitor 220. Then the control voltage v, which controls the on-time of the active devices 100 and 102, as well as compensates the leakage current error, is generated. In this way, the average current in diode 103 is used to compensate the leakage current error. The controller 210 is a typical structure of a primary-side current regulation control IC for flyback converters. The invention may thus be used in any condition where such an IC is applicable. The flyback converter employing this circuit thus makes use of two primary side sensing approaches—the primary side transformer current and a leakage current (which is a current resulting during de-magnetization of a leakage inductance). In this way, the primary side sensing is able to determine the current at the secondary side more accurately, and thereby provide improved primary side regulation of the output current at the secondary side. The second sensing circuit 420 provides a variable compensation to the primary side current sensing to enable more effective primary side current regulation. When the control voltage $V_c$ increases, meaning that the leakage current is increasing thereby the secondary current is not enough, the current regulation circuit may increase the duty cycle of the flyback converter (duration of the charging phase) such that more energy can be delivered to the secondary side; otherwise the duty cycle can be reduced.

The example of FIG. 4 is based on compensating the leakage current based on the sensed average current of the clamping diode 103.

The first sensing circuit 400 comprises a sample and hold structure of a switch 216 and capacitor 215. Optionally a gain may be applied by an amplifier and a buffer may be provided. The held signal is applied to a chopping switch 214 which applies the output to an RC filter 213 during a particular time interval, as explained below. The output is provided to the OTA 212 of the controller 210.

The second sensing circuit 420 comprises the RC filter 202,203 which receives the sensed current signal of the clamping diode 103. The filtered signal is applied to the amplifier 206 which performs an adding and scaling function. It adds the signal to a reference signal "reference". This provides a corrected reference signal which then sets a compensation signal at the output of the amplifier 206, which is then applied to the first OTA 211 of the controller 210. Thus, the sensed current from the first sensing circuit 400 is compared by the controller to a reference which depends on the leakage current.

The controller 210 generates a control voltage $V_C$ for the power converter which thus compensates for this leakage current. This control voltage is held on the capacitor 220.

Figure 5:
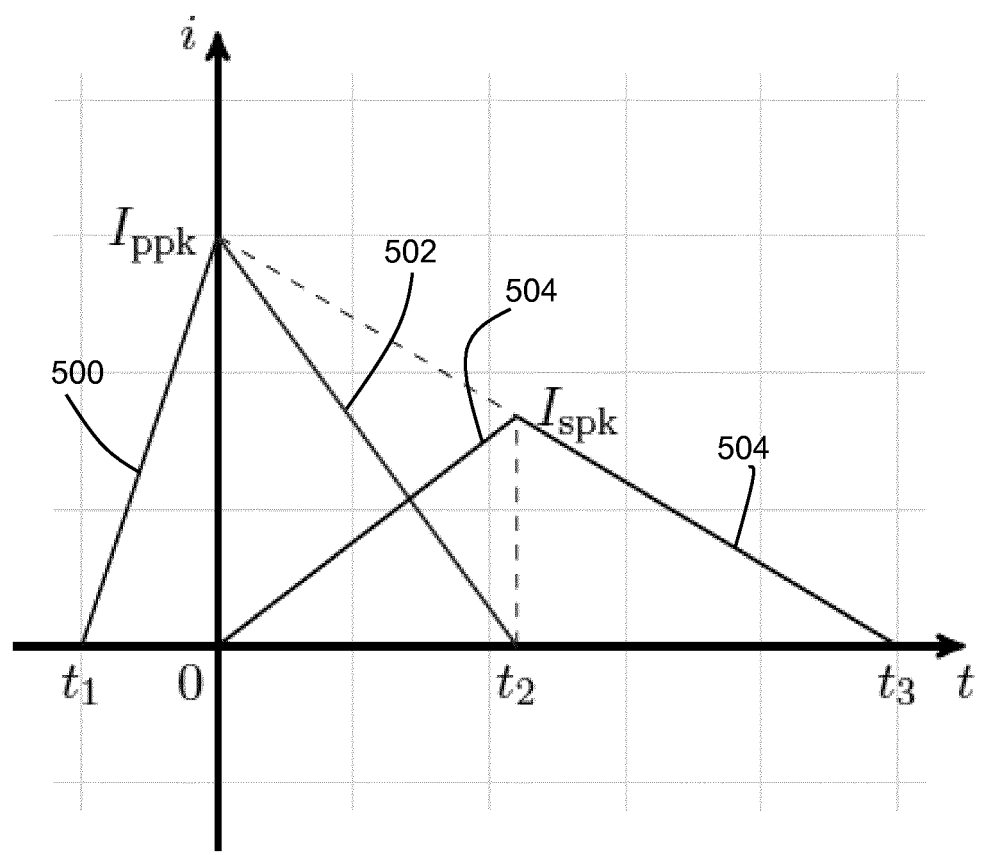
FIG. 5 is a timing diagram to show parameters which allow the circuit operation to be understood.

The operation of the circuit of FIG. 4 will now be explained in more detail. The definitions shown in Table 1 below will be used, some of which are shown in FIG. 5. In FIG. 5, the primary side current is shown as plot 500. The leakage current (flowing through the clamping diodes 101, 103) is shown as plot 502. The secondary side current is shown as plot 504.

TABLE 1

| | |
|---|---|
| $I_{ppk}$ | Primary side peak current. |
| $I_{spk}$ | (Reflected) Secondary side peak current. |
| $t_1$ | On-time of the active devices $t_{on} = -t1$. |
| $t_2$ | Point in time when diode 103 stops conduction or demagnetizing of leakage inductance finishes. Clamping diode phase is defined by ta?? (0, $t_2$). |
| $t_3$ | Point in time when output diode 105 stops conduction. Solo output diode phase is defined by ta?? ($t_2$, $t_3$). |

The circuit may be defined as being in a "solo output diode phase" during the time interval $t_2$ to $t_3$.

Any real transformer can be modelled according to the cantilever model, therefore the turns ratio may be taken to be the equivalent turns ratio in the cantilever model, rather than the ratio of the physical turns.

From the basic geometry of FIG. 5, it follows that:

$$\frac{I_{spk}}{t_3 - t_2} = \frac{I_{ppk}}{t_3}$$

This can be rewritten as:

$$\frac{I_{spk}t_3}{2T_{sw}} = \frac{I_{ppk}t_3}{2T_{sw}} - \frac{I_{ppk}t_2}{2T_{sw}}$$

where $T_{sw}=t_3 t_1+T_{res}$ and $T_{res}$ is the quasi-resonance time.

After time $t_3$ the converter enters the so-called "quasi-resonant" time where both the active devices (100, 102) and the output diode 105 are off. In the critical-conduction mode (CRM), the $T_{res}$ state ends at $t_3+T_{res}'$, $T_{res}'$ being the real quasi-resonant time, when the voltage on the lower active device circles (resonates) to the valley of a sinusoidal curve. In the discontinuous mode (DCM), there is another controlled delay ($T_{delay}$) after the voltage on the lower device gets to its valley, before next cycle starts. Therefore, in our condition, the $T_{res}$ is defined for both CRM and DCM, by $T_{res}=T'_{res}+T_{delay}$.

The left-hand side of this equation is the reflected output current, $I_{out}$.

Thus, the purpose of the division by $2T_{sw}$ is that the left-hand side of the equation becomes equal to the output current, $I_{out}$ and this is the parameter to be controlled in a current regulating driver. The second term in the right-hand side is the average current in the clamping diodes, $I_{dch}$.

Let the reference signal $V_{ref}=I_{out} \cdot R_{scale}$, where $R_{scale}$ is an arbitrary trans-resistance according to the application. This means the previous equation can be replaced by:

$$\frac{V_{ref}}{R_{scale}} = \frac{I_{ppk}R_{csp}}{2R_{csp}} \cdot \frac{t_3}{T_{sw}} - I_{dch}$$

This can be rearranged to:

$$\frac{2R_{csp}}{R_{can}}\left(\frac{V_{ref}R_{can}}{R_{scale}} + I_{dch}R_{csn}\right) = I_{ppk}R_{csp} \cdot \frac{t_3}{T_{sw}}$$

Thus, the level of $V_{ref}$ is chosen such that it is equal to the desired output current multiplied by a scaling resistance $R_{scale}$. Thus, $V_{ref}$ is a control input used for setting the output current $I_{out}$.

In particular, this reference signal $V_{ref}$ is thus a direct representation of the desired output current $I_{out}$. The primary side regulation is used to set this output current by applying a suitable value of $V_{ref}$.

This last equation is implemented by the circuit of FIG. 4.

The first sensing circuit 400 provides a current sense voltage of $I_{ppk} \times R_{scp}$, in that the voltage based on the peak current flowing through resistor $R_{csp}$ is sampled and stored on capacitor 215. The chopper applies the factor $t_3/T_{sw}$ by applying the output to the filter only during time period 0 to $t_3$.

$I_{dch}R_{csn}$ is the voltage representing the average current in diode 103, therefore the reference signal, before reaching the non-inverting input port of the op amp (206 in FIG. 4), should be pre-scaled by a resistive divider to $R_{csn}/R_{scale}$, and the gain of the amplifier 206 should be $2R_{csp}/R_{csn}$.

The averaging is implemented by the filter 202,203. The amplifier 206 implements the gain of $R_{csn}/R_{scale}$ as well as the addition of the $V_{ref}$-based term in the equation above.

The controller 210 in this way regulates the control voltage $V_C$ to make the two inputs equal. Thus, the effect of the feedback control is to provide a control voltage $V_C$ such that the two inputs are equal, i.e. the equation above is satisfied.

Figure 6:
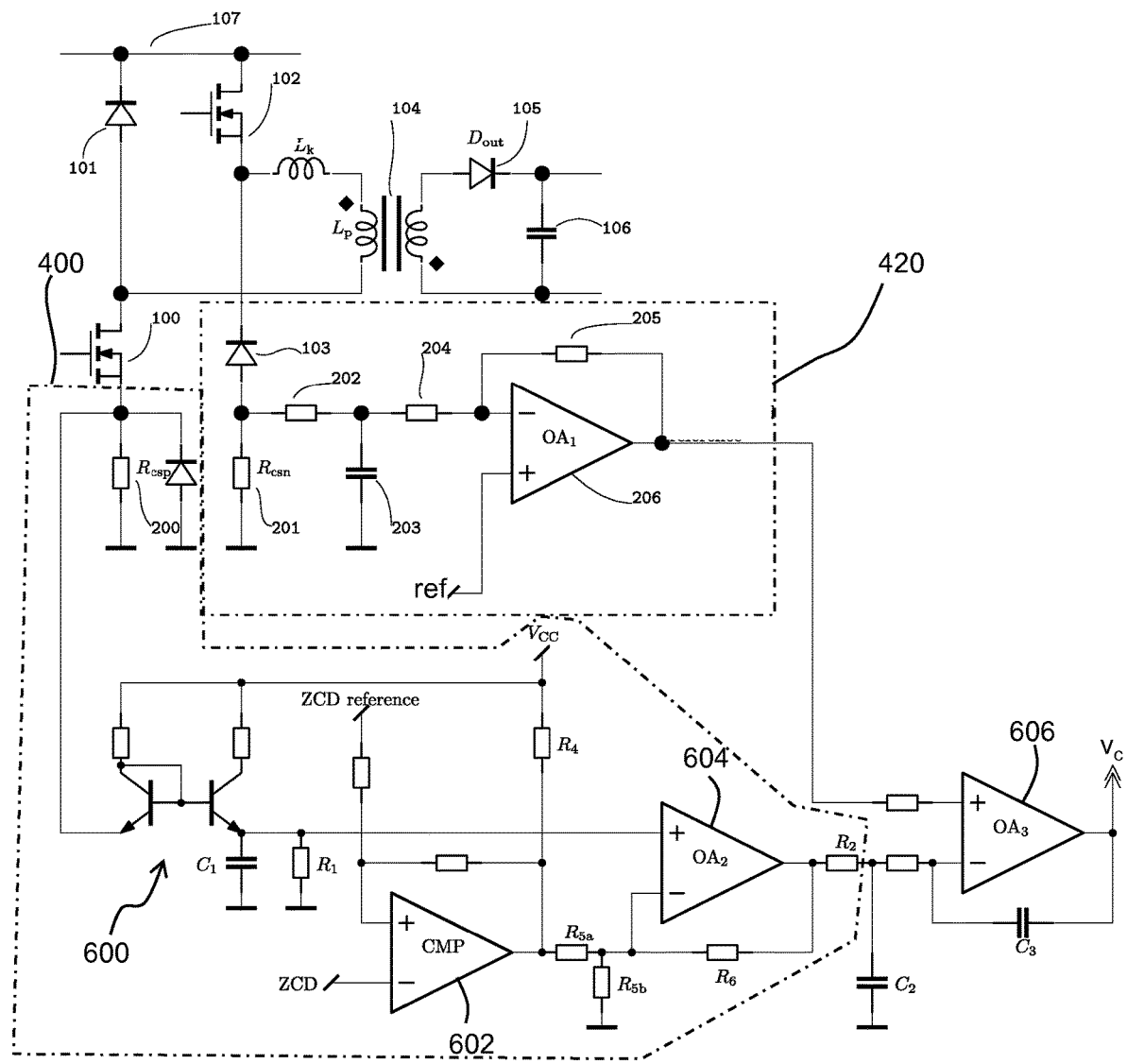
FIG. 6 shows a second example of a primary side sensing circuit for application to a flyback converter.

FIG. 6 shows a discrete implementation of the circuit of FIG. 4. The second sensor circuit 420 is the same.

In the first sensor circuit 400, the sample and hold function is implemented by a current mirror 600 comprising two NPN transistors. The peak current in the transistor 100 is held on the first filter circuit $C_1$ and $R_1$.

The chopper is implemented by the comparator 602 which has a reference input in the form of a zero crossing detection signal, ZCD. The signal ZCD has the same phase as the voltage on the secondary winding of the transformer and is for example derived from an auxiliary winding as shown in FIG. 2.

When the output diode 105 conducts, the comparator 602 pulls an output resistor $R_{5a}$ to ground, then the peak held current is amplified to the output of the operational amplifier 604. In other conditions, the output of the comparator 602 is in open-drain configuration, and the output of the amplifier 604 is low. The chopped signal is averaged on a second filter circuit $R_2$ and $C_2$ and the output $V_C$ is generated by the operational amplifier 606.

The examples of FIGS. 4 and 6 are based on monitoring the average current in the clamping diodes. The average current in the clamping diodes is not however a necessary input to implement the primary-side regulation.

Instead, the conduction duration of the clamping diodes can be used.

Since:

$$I_{apk} = \frac{t_3 - t_2}{t_3} \cdot I_{ppk}$$

The reflected output current is found by:

$$I_{out} = \langle I_{spk} \rangle_{Tsw} = \frac{I_{spk} t_3}{2T_{sw}} = \frac{I_{ppk}(t_3 - t_2)}{2T_{sw}}$$

Figure 7:
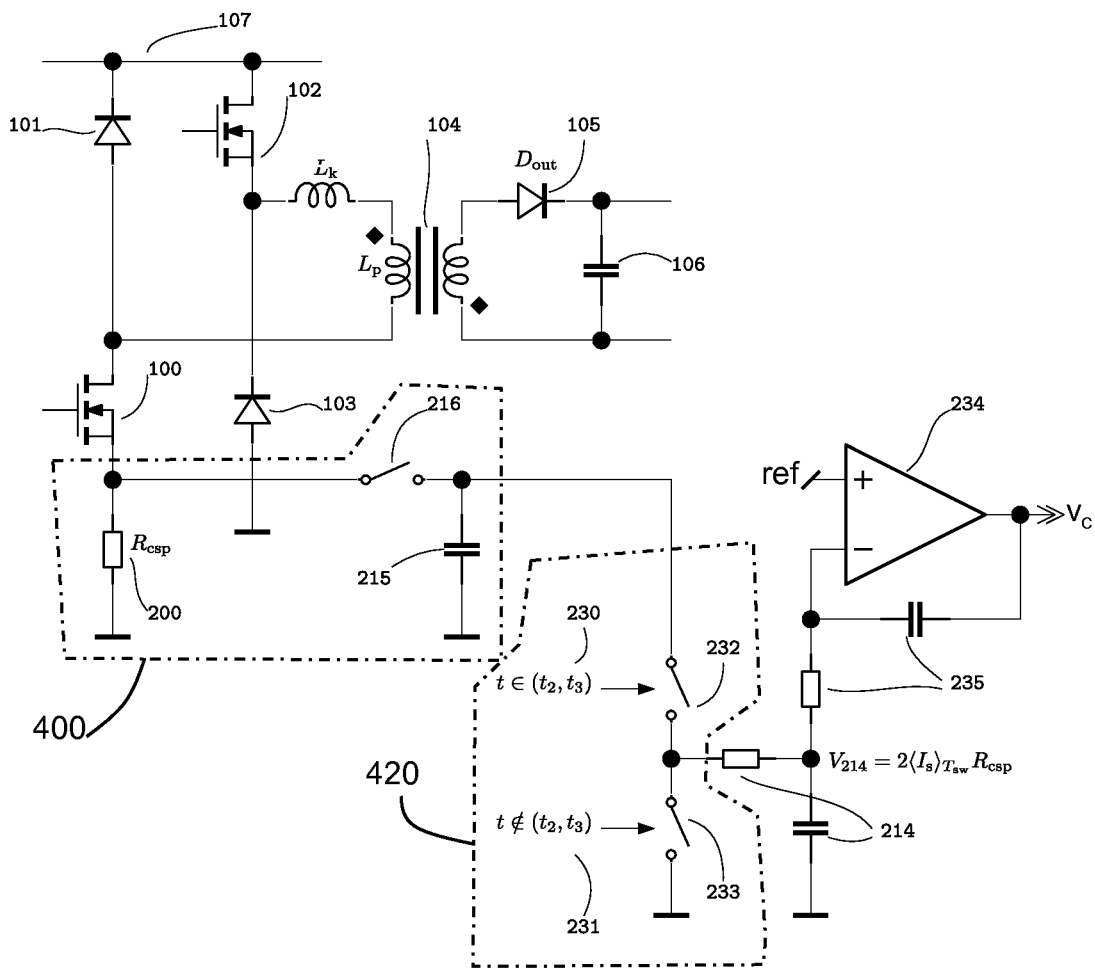
FIG. 7 shows a third example of a primary side sensing circuit for application to a flyback converter.

FIG. 7 shows an alternative implementation which avoids the need for current monitoring of the clamping diode current and is instead based on the equation above.

As in the circuit of FIG. 4, the current through transistor 100 (and therefore 102) is measured using the current sense resistor 200 ($R_{csp}$). The peak current is again sampled and held by switch 216 and capacitor 215.

The second sensing circuit 420 again derives a parameter which depends on the leakage current. However, this does not involve measuring currents, but involves obtaining timing information. In particular, the timing instants $t_2$ and $t_3$ are used as parameters which depend on the leakage current.

In general, there is a time detection circuit adapted to detect a time period related to the freewheeling phase (0-$t_3$), and this applies also to the circuits of FIGS. 4 and 6. For the circuit of FIG. 6, the time detection circuit (which may be considered to be part of the second sensing circuit 420) is adapted to detect a first portion (0-$t_2$) of the freewheeling phase (0-$t_3$) during which the leakage current at the primary side drops from a peak value to zero. This functions as the parameter which depends on the leakage current. A second portion ($t_2$-$t_3$) is also detected from when the leakage current at the primary side drops to zero to the secondary side current to the load drops to zero, of the freewheeling phase (0-$t_3$).

The circuit of FIG. 7 comprises a first (high side) switch 232 for coupling the output of the first sensing circuit 400 to an input to an output filter 214 having a voltage output $V_{214}$. A second (low side) switch 233 is provided for coupling the input to the output filter 214 to ground.

The switch 232 turns on and switch 233 turns off when $t_2 < t < t_3$ (condition 230), otherwise switch 233 turns on and switch 232 turns off (condition 231).

In this way a signal $V_{214}$ representing the average output current is created on the RC filter 214. An amplifier 234 with feedback structure 235) generates the control voltage $V_C$. The higher the control voltage $V_C$, meaning the secondary current is lower, and the current regulation circuit may increase the duty cycle of the flyback converter (duration of the charging phase) such that more energy can be delivered to the secondary side; otherwise the duty cycle can be reduced.

For the circuit of FIG. 7 the following equation of the average voltage on the RC filter 214 holds:

$$\frac{I_{ppk} R_{csp} - V_{214}}{R_{214}} \cdot (t_3 - t_2) - \frac{V_{214}}{R_{214}} \cdot (T_{sw} - (t_3 - t_2)) = 0$$

Solving this equation leads to:

$$V_{214} = I_{ppk} R_{csp} \cdot \frac{t_3 - t_2}{T_{sw}}$$

Therefore:

$$V_{214} = 2(I_{spk})_{T_{sw}} R_{csp} = 2 I_{out} R_{csp}$$

In this way a signal representing the average output current is built on the RC filter 214. It is based on determining the conduction time interval of the clamping diodes.

In the two implementations above, a signal indicating the diode phase (time interval when any diode conducts) must present. For a dual-switch flyback converter that works in critical conduction mode it is reasonable to use the zero-crossing-detection (ZCD) signal.

In the discontinuous mode, where a resonance phase is included, an unwanted equivalent ZCD signal is often generated in the resonance phase, which can false trigger the chopper circuit. This in turn leads to a higher feedback signal and a lower controlled output current.

Figure 8:
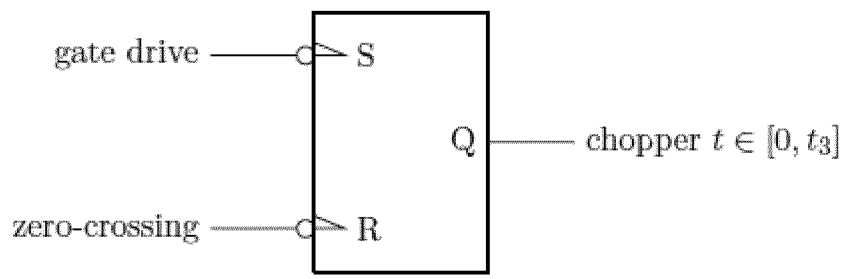
FIG. 8 shows a latch circuit which may be used as part of the circuit implementation.

An improvement may be obtained by introducing a memory device, such as an S-R latch, as shown in FIG. 8. The "set" input is triggered by the falling edge of the low-side gate drive, while the "reset" input is triggered by the falling edge of the zero-crossing, ZCD, signal.

The invention can be implemented inside an integrated circuit or discretely.

The invention is of particular interest for a dual-switch flyback platform, which is for example for use in middle- to high-end LED driver products with driving power range from 30 to 300 W, for both indoor and outdoor LED lighting applications.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together

The invention claimed is:

1. A flyback converter with a primary side regulation of the output current at the secondary side, the flyback converter comprising:
    a transformer comprising a primary side for connection to an input supply and a secondary side for connection to a load;
    a first switching circuit at the primary side adapted to allow the primary side to accumulate power from the input supply in a charging phase and to allow the secondary side to release a portion of the accumulated power to the load in a freewheeling phase;
    a first sensing circuit to sense the primary side current in the charging phase; and
    a second switching circuit at the primary side to allow another portion of accumulated power at the primary side to flow back to the input supply as a leakage current, in the freewheeling phase;
    a second sensing circuit to derive a parameter which depends on the leakage current; and
    a controller to derive a control signal ($V_C$) for controlling the first switching circuit in dependence on the outputs of the first and second sensing circuits;
    wherein the flyback converter further comprises a time detection circuit adapted to detect a time period of the freewheeling phase, and the controller is adapted to calculate a difference between the total charge released from a peak current in the primary winding for the time period of the freewheeling phase and the charge released by the leakage current in the freewheeling phase, wherein said difference is representative of the secondary side current and the controller is adapted to derive the control signal ($V_C$) according to the difference.

2. The flyback converter as claimed in claim 1, wherein the controller is adapted to:
    determine a secondary side current at the secondary side based on the sensed primary side current and the parameter which depends on the leakage current; and
    derive the control signal ($V_C$) for controlling the first switching circuit in dependence on the determined secondary side current and a reference current.

3. The flyback converter as claimed in claim 1, wherein the first switching circuit comprises synchronized first and second transistors in series each side of a primary side winding at the primary side, between a positive and negative input, and the second switching circuit comprises first and second diodes in series each side of the primary side winding and in series with the input supply, between a negative input and a positive input, thereby forming an H-bridge, and the control signal being gate or base drive signals for the transistors,
    the flyback converter further comprises the input supply which comprises:
    an input capacitor ($C_{in}$) between the positive input and the negative input, and the second switching circuit (101, 103) is adapted to allow the leakage current to flow back to the input capacitor and the input capacitor ($C_{in}$) is adapted to be connected to a time varying voltage supply.

4. The flyback converter as claimed in claim 1, further comprising an output diode between the secondary side and an output load connection, which output diode is adapted to block the induced power to flow to the load in the charging phase and allow it in the freewheeling phase.

5. The flyback converter as claimed in claim 1, wherein the first sensing circuit comprises:
    a primary winding current sensing resistor ($R_{scp}$) in series with the first switching circuit and the primary side winding; and
    a sample and hold circuit for sampling a peak voltage across the primary winding current sensing resistor which corresponds to the peak current through the primary side winding.

6. The flyback converter as claimed in claim 5, wherein the controller is adapted to derive the control signal ($V_C$) for controlling the first switching circuit in dependence on said difference.

7. The flyback converter as claimed in claim 1, wherein the second sensing circuit comprises:
    a freewheeling current sense resistor ($R_{csn}$) in series with the second switching circuit and the primary side winding, adapted to sense the amplitude of the leakage current in the freewheeling phase as the parameter;
    a filter; and
    a comparator, wherein the output of the comparator is provided as the output of the second sensing circuit.

8. The flyback converter as claimed in claim 7, wherein the filter output is provided to the comparator which compares the filter output with a reference, and the comparator comprise a feedback loop with a certain gain to the filter output.

9. The flyback converter as claimed in of claim 7, wherein the time detection circuit comprises:
    a zero crossing detection circuit and the time detection circuit is for deducing the time period according to the zero crossing signal; or
    a zero crossing detection circuit to detect the zero crossing signal and a latch circuit for deducing the time period, having as inputs a base or gate drive signal for the first switching circuit and the detected zero crossing detection signal.

10. The flyback converter as claimed in claim 1, wherein the time detection circuit is adapted to detect:
    a first portion, as the parameter, of the freewheeling phase during which the leakage current at the primary side drops from a peak value to zero; and
    a second portion, from when the leakage current at the primary side drops to zero to the secondary side current to the load drops to zero, of the freewheeling phase.

11. The flyback converter as claimed in claim 10, wherein the controller comprises a filter that is charged and discharged according to the detected portions of time.

12. The flyback converter as claimed in claim 11, wherein the controller further comprises:
    a charging circuit for providing the sampled peak voltage to charge the filter during a second portion, from when the leakage current at the primary side drops to zero to the secondary side current to the load drops to zero, of the freewheeling phase of the freewheeling phase.

13. The flyback converter as claimed in claim 12, wherein the chopper circuit is further for providing a ground signal to discharge the filter at times outside the second portion of the freewheeling phase.

14. The LED driver comprising a flyback converter as claimed in claim 1 comprising an input for connection to an external power supply and an output for connection to a LED load.

15. The lighting device comprising the LED driver as claimed in claim 14 and the LED load connected to the LED driver.

\* \* \* \* \*